(12) United States Patent
Beier

(10) Patent No.: US 7,507,057 B2
(45) Date of Patent: Mar. 24, 2009

(54) DEBURRING TOOL FOR DEBURRING ON THE INTERIOR AND/OR EXTERIOR

(75) Inventor: Hans-Michael Beier, Altlandsberg (DE)

(73) Assignee: Beier Entgrattechnik Spezial-Entgrat Werkzeuge, Atlandsberg (DE)

( * ) Notice: Subject to any disclaimer, the term of this patent is extended or adjusted under 35 U.S.C. 154(b) by 605 days.

(21) Appl. No.: 10/504,360

(22) PCT Filed: Mar. 27, 2003

(86) PCT No.: PCT/DE03/01010

§ 371 (c)(1),
(2), (4) Date: Mar. 31, 2005

(87) PCT Pub. No.: WO03/084702

PCT Pub. Date: Oct. 16, 2003

(65) Prior Publication Data

US 2005/0220550 A1    Oct. 6, 2005

(30) Foreign Application Priority Data

| Apr. 5, 2002 | (DE) | ................................ 102 15 004 |
| Dec. 17, 2002 | (DE) | ................................ 102 58 914 |
| Dec. 17, 2002 | (DE) | ................................ 102 58 915 |
| Feb. 12, 2003 | (DE) | ................................ 103 05 676 |
| Feb. 12, 2003 | (DE) | ................................ 103 05 705 |
| Feb. 12, 2003 | (DE) | ................................ 103 05 727 |
| Mar. 10, 2003 | (DE) | ................................ 103 10 270 |

(51) Int. Cl.
*B23B 51/00* (2006.01)

(52) U.S. Cl. .......................... 408/57; 408/147; 408/155; 409/8

(58) Field of Classification Search ............... 408/57, 408/59, 147, 146, 154–156, 199, 224, 223, 408/714; 407/33, 34, 51, 53, 56; 82/113, 82/1.11; 409/8, 9, 131–132, 139–140; *B23B 51/10, B23B 29/034*

See application file for complete search history.

(56) References Cited

U.S. PATENT DOCUMENTS 2,657,597 A * 11/1953 Pickering et al. ............ 408/200

(Continued)

FOREIGN PATENT DOCUMENTS

DE    19951 980    5/2001

(Continued)

OTHER PUBLICATIONS

Hans-Michael Beier, Entgraten unterschiedlich bearbeiteter Kanten, Werkstatt and Betrieb, 1991, pp. 825-826, vol. 124, No. 10, Germany.

(Continued)

*Primary Examiner*—Daniel W Howell
(74) *Attorney, Agent, or Firm*—Norris, McLaughlin & Marcus; Christa Hildebrand

(57) ABSTRACT

The invention pertains to a deburring tool for deburring the interior and/or exterior of work pieces, for example, abutting edges on intersecting bores or on longitudinal and transverse grooves in bores or on transverse bores in a deep-hole bore with different diameters of an engine block, tubular work piece ends, edges on and in flat work piece surfaces or surfaces of a toothed wheel or a sprocket wheel. The deburring tool can be used in machine tools and is pressure-controlled. The cutting forces can be variably adapted to the burr dimensions that change during the machining process and to different materials. Corresponding embodiments of the deburring tool ensure the deburring of different work pieces with a good quality and in a short period of time. The inventive deburring tool is particularly advantageous in that it can be used in intermittent assembly lines with the latest manufacturing technologies.

62 Claims, 8 Drawing Sheets

U.S. PATENT DOCUMENTS

| | | | |
|---|---|---|---|
| 3,834,254 A * | 9/1974 | Smestad | 82/113 |
| 4,224,846 A * | 9/1980 | Eysel et al. | 82/158 |
| 4,343,577 A * | 8/1982 | Purdon | 408/226 |
| 4,680,998 A * | 7/1987 | Council, Jr. | 82/1.11 |
| 4,766,665 A * | 8/1988 | McKernan et al. | 29/557 |
| 4,941,782 A * | 7/1990 | Cook | 408/147 |
| 5,077,876 A * | 1/1992 | McConkey | 29/27 R |
| 5,159,741 A * | 11/1992 | Garschagen et al. | 29/27 R |
| 5,293,794 A * | 3/1994 | Mosey | 82/125 |
| 5,304,019 A * | 4/1994 | Klee et al. | 408/156 |
| 5,829,925 A * | 11/1998 | Nordstrom | 408/57 |
| 6,270,295 B1 * | 8/2001 | Hyatt et al. | 408/1 R |
| 7,090,445 B2 * | 8/2006 | Woodruff et al. | 408/59 |
| 2005/0163579 A1 * | 7/2005 | Gaiser | 408/156 |

FOREIGN PATENT DOCUMENTS

| | | |
|---|---|---|
| DE | 19951980 | 5/2001 |
| JP | 03-087507 | 4/1991 |
| JP | 07-051931 | 2/1995 |
| JP | 11156612 A * | 6/1999 |
| JP | 11-309605 | 11/1999 |
| JP | 2002-001603 | 1/2002 |
| RU | 2009786 C1 * | 3/1994 |
| SU | 1 020 192 A | 5/1983 |

OTHER PUBLICATIONS

Beier, Hans-Michael. "Werkstatt und Betrieb", (Trade Journal by Publisher Carl Hanser Verlag, München, 1998); pp. 383-386.

* cited by examiner

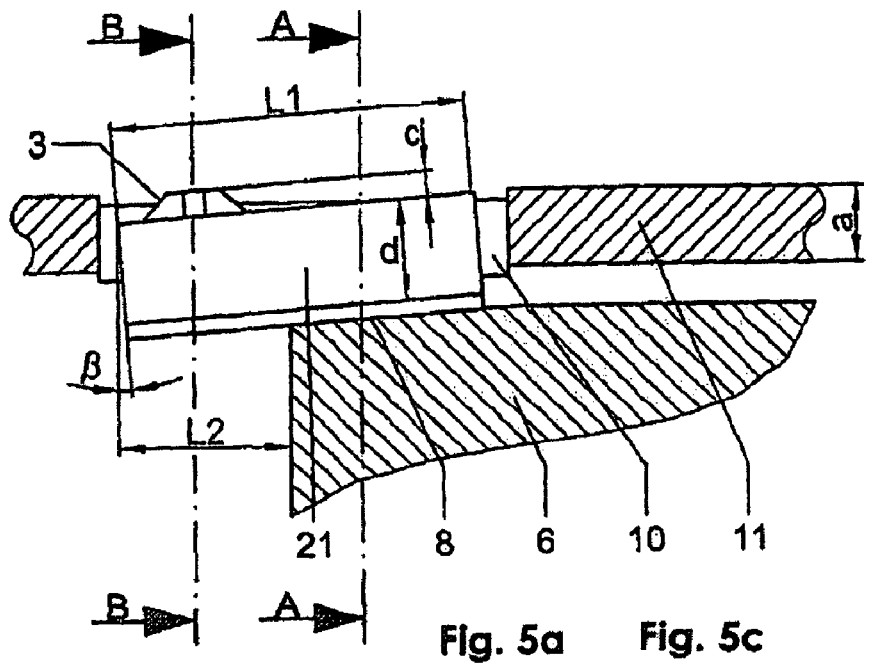
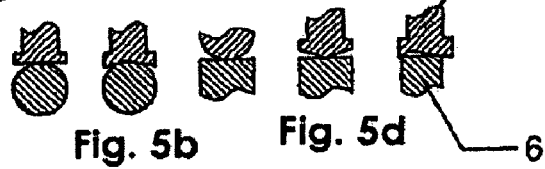
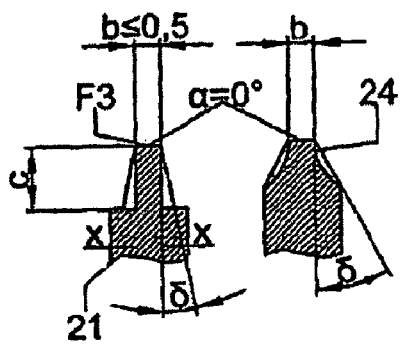
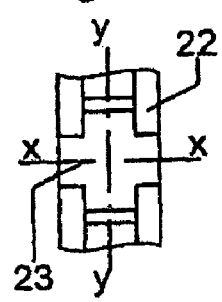
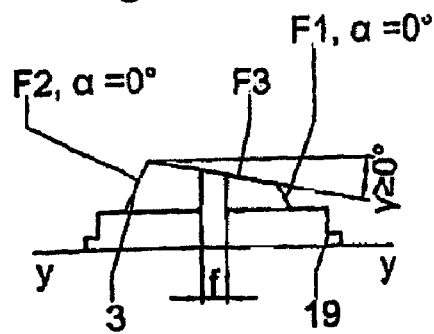
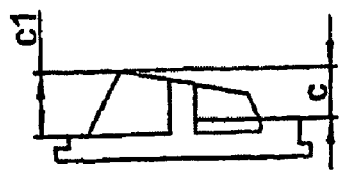

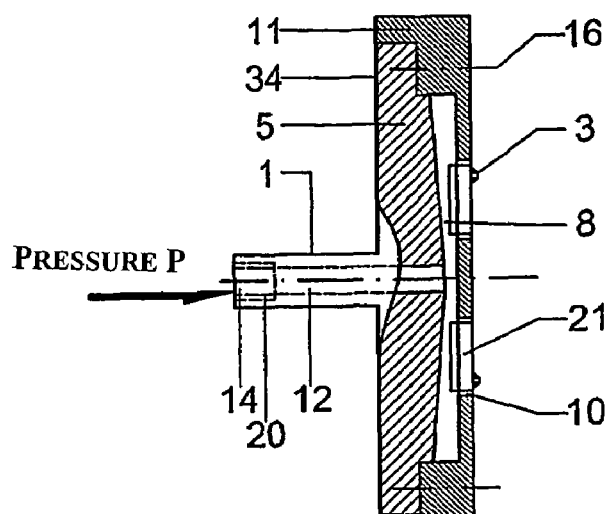
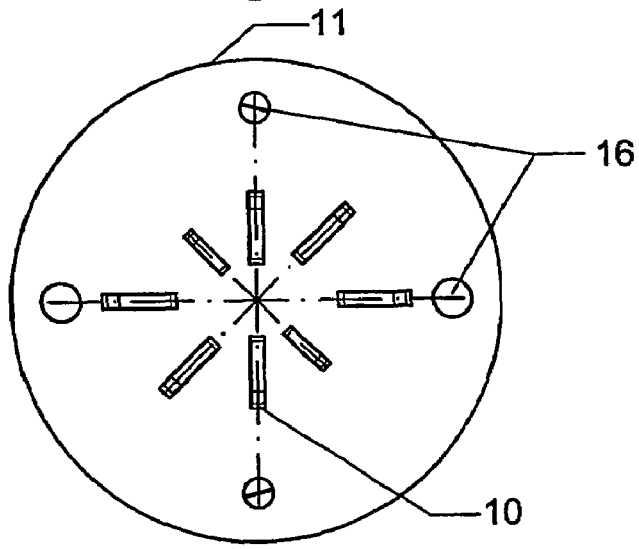
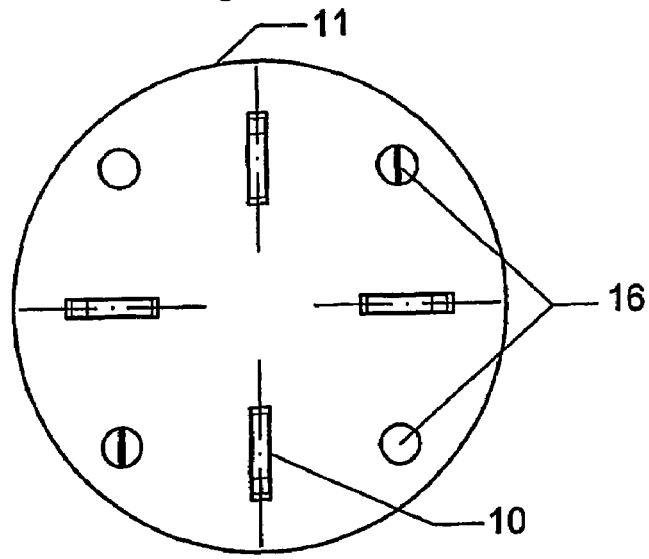

DEBURRING TOOL FOR DEBURRING ON THE INTERIOR AND/OR EXTERIOR

BACKGROUND OF THE INVENTION

The invention pertains to a deburring tool for deburring the interior and/or exterior of work pieces, for example, abutting edges on intersecting bores or on longitudinal and transverse grooves in bores or on transverse bores in a deep-hole bore with different diameters of an engine block, tubular work piece ends, edges on and in flat work piece surfaces or surfaces of a toothed wheel or a sprocket wheel, as well as to a corresponding method. During its intended use, the deburring tool is moved in a rotatory or translatory fashion, wherein the deburring tool comprises a tool shaft that has a clamping end and an end with in inner support member and at least one blade member with a cutting edge that is movably arranged in an opening.

A deburring tool for deburring abutting edges in bores is known from the state of the art, namely DE 43 07 084 C2. This deburring tool is characterized in that the cutting edge is subjected to a radially exerted spring force by the support member that is seated in the central recess and consists of an elastomer material, wherein the blade member that is movably guided in an opening has a support surface, by means of which it is supported on the support member. Once a certain force is exceeded, the cutting edge yields in a springable fashion. It is also possible to accommodate the support member in the recess with a certain prestress. Due to the support on the support member, the blade member is able to carry out movements that should allow an effective deburring, namely also of interior abutting edges. A combined radial and axial guide is provided for the deburring tool. The axial component is intended to simplify the insertion into the bores of the work piece, and the axial movement of the deburring tool is transformed into a radial movement of the blade member due to the design of the corresponding support surface of the opening. In order to make it possible to carry out the required movements, the support member can also be adapted to the respective requirements by choosing the shape, the material and the material quality accordingly. The support member has the shape of a pyramid, a truncated pyramid, a cone, a truncated cone, a prism, a sphere or a cylinder. However, the required movements can also be realized with a combination of a correspondingly shaped support member and a correspondingly shaped recess. The recess is preferably realized in the form of a truncated cone, a prism or a cylinder. Such shapes are also is chosen for the design of the opening. A limitation of the blade member travel in order to prevent a radially outward directed movement thereof is achieved by providing the blade member with a so-called leg for supporting the blade member on the inner surface sections of the recess that are situated laterally of the opening. The decisive disadvantage of the deburring tool disclosed in DE 43 07 084 C2 can be seen in the fact that, when the deburring tool is inserted into the bores, the cutting edge(s) adjoin the bore wall with the spring force exerted by the support member and consequently produce tracks that cannot be measured, but rendered visible with light-optical methods. Such tracks are particularly undesirable, for example, in reamed bores in the engine block. Another disadvantage is that the support member has to be exchanged each time the material of the work piece to be processed changes. Such an exchange of the support member is extremely difficult, in particular, with smaller tool diameters, e.g., on the order of 2 mm.

All known deburring tools also have the disadvantage that they cannot adapt to burr dimensions that change during the machining process due to the increasing wear of the burr-producing tools. When using a new tool, i.e., a tool that is at the beginning of its useful life, the burr being produced during the machining of the work piece is still small. However, the size of the burr can increase 10-times by the time the tool reaches the end of its useful life. The dimensions of known deburring tools currently are invariably based on the burr dimensions at the end of the tool life. This causes gradually changing chamfers to be produced on the parts of the work piece to be deburred. Another important aspect is that known deburring tools frequently can only be used for deburring a work piece or parts of a work piece, e.g., for the interior deburring of abutting edges in bores or on transverse bores of a work piece or for the exterior deburring of edges on work piece surfaces. It is disadvantageous that these deburring tools frequently require a high manufacturing expenditure and do not make it possible to achieve the short deburring times required in modern intermittent assembly lines. In addition, there is currently no deburring tool or deburring system available on the market which can be universally utilized for the deburring of work pieces, for example, abutting edges on intersecting bores or on longitudinal and transverse grooves in bores or on transverse bores in a deep-hole bore with different diameters of an engine block, tubular work piece ends, edges on and in flat work piece surfaces and on surfaces of a toothed wheel or a sprocket wheel.

Consequently, the invention is based on the objective of developing a deburring tool for the interior and/or exterior deburring of work pieces of the initially described type which adapts the cutting forces to burr dimensions that change during the machining process and to different materials, wherein said deburring tool can be manufactured with a low expenditure, allows a simple handling of smaller tool diameters and ensures a high-quality deburring of work pieces of different geometric shapes and sizes within the short cycle times achieved in modern intermittent assembly lines.

BRIEF SUMMARY OR THE INVENTION

According to the invention, this objective is attained with a deburring tool with the characteristics of independent claim 1. The play of the blade member that is movably supported on the surface of the support member is chosen such that the cutting edge(s) do not fall inward at a pressure p=0 bar. This means that the cutting edge(s) are reliably guided in the tubular shaft section and do not adjoin the bore surface with a force F higher than zero Newton. An exact guidance of the cutting edge is achieved in that the blade member comprises a blade center section with a cutting edge, a radial, lateral limitation of the cutting edge travel and a radial limitation of the cutting edge travel on the side of the face, respectively, or a cylindrical limitation of the cutting edge travel.

It is advantageous that the cutting edge(s) do not produce any visible tracks in the bore wall when the deburring tool is inserted into the bore. The differently designed surfaces of the support member and the blade member with respect to their shapes and dimensions result in a constant surface differential that, in turn, invariably causes an outward movement of the cutting edge(s) in dependence on the pressure. The surfaces of the support member and the blade member may be realized rectangular, triangular, cylindrical or prismatic, wherein the surfaces may be arranged parallel or non-parallel referred to the longitudinal axis of the tool shaft. In addition, the blade member supported in the opening of the tubular shaft section has such dimensions that only a minimal pressure drop occurs during the deburring process, and that a more intense pressure drop is ensured while the deburring tool is inserted and removed. The medium pressed into the through-bore of the tool shaft under pressure may consist of a liquid or gaseous medium or of a liquid/gas mixture and causes the cutting edge(s) to move outward. In this case, the pressure p on the blade member surface should always be higher than the atmospheric pressure and lower than 500 bar, preferably between 4 and 60 bar. Drilling emulsions, drilling oils or a mixture or other mediums suitable for cooling and/or lubricating purposes may be considered as liquid mediums. The supply is realized via the existing hollow work spindles of machine tools, but also via a separate connection on the support or on the machine tool. Gases such as, for example, welding gases, inert gases, compressed air or carbon monoxide may be considered as gaseous mediums. It would also be conceivable to introduce a liquid/gas mixture such as, for example, air that contains 10-15 percent admixed drilling oil.

For example, when deburring abutting edges on a transverse bore in an engine block, a pressure p of 3 bar needs to be programmed on the machine tool control before the deburring tool is inserted into the bore. While the tool is inserted into the bore, the cutting edges that lie outside the tool shaft are moved inward. This opens up partial regions of the opening and the liquid or gaseous medium pressed into the through-bore of the deburring tool is able to escape. As the cutting edge is inserted into the transverse bore, it is moved outward by the pressure created due to the surface differential between the support member and the blade member. A certain force that can be used for the deburring process is now being exerted. A more precisely controlled introduction of the medium into the through-bore of the tool shaft can be achieved for the deburring of smaller bore diameters below 4.5 mm if the tubular shaft section of the deburring tool is connected to the tool shaft by an internal setscrew that extends through the through-bore transverse to the longitudinal axis, wherein the core diameter $D1$ of the internal setscrew is smaller than the diameter $D3$ of the through-bore and its diameter D is equal to the diameter of the through-bore. The internal setscrew also contains a groove in the region of the through-bore, and its and on the side of the shaft section is realized in a conical fashion with an angle $\alpha<10$ degrees. It is advantageous that the pressure p can be increased in a programmed fashion as the burr dimensions increase due to the wear of the drill, namely in dependence on the material and the quantity drilled. It would even be conceivable to advance the deburring tool to the base of the burr on the transverse bore to be deburred in an unpressurized fashion.

The deburring tool according to the invention can be easily handled, namely even when using small tool diameters. This is achieved, among other things, because no exchange of the functional components is required. In addition, tests have demonstrated that the deburring tool can be utilized for deburring uneven bore openings. In such instances, the radial plane or parts of this plane are, for example, inclined at the point at which the tool emerges. The deburring of abutting edges on larger transverse bores with a diameter larger than 3 mm is currently still problematic because the productivity cannot be increased by increasing the advance/cutting speed and the quality of the deburring result becomes inferior. It can be ascertained that the cutting edges are arranged on the blade members in the tubular shaft section and lie in the openings such that they are distributed over the circumference of the shaft section, wherein the area of contact does not extend over the entire cutting edges. The cutting edges of the deburring tool are also arranged in one plane viewed in the axial direction. The proposed embodiment of the deburring tool is characterized in that at least two openings are arranged closely adjacent to one another in the tubular shaft section in a radially symmetric fashion and offset relative to one another in the axial direction by a distance m. However, the openings in the tubular shaft section may also be arranged asymmetrically. The distance m is always smaller than the advance of the cutting edge. A high-quality deburring result can advantageously be achieved within an extremely short period of time because a larger number of a cutting edges are now in direct contact. The rotational speed of the deburring tool can be increased to >2000 rpm at the same pressure ratios. This means that the deburring tool fulfills the prerequisites for use in intermittent assembly lines that utilize the latest manufacturing technologies.

Another embodiment of the deburring tool according to the invention now also makes it possible to simultaneously deburr abutting edges on intersecting bores with different diameters in a deep-hole bore. This means that additional deburring tools are no longer required. For this purpose, the tubular shaft section of the deburring tool which contains the centrally arranged through-bore and carries a deburring unit on its end is extended with another deburring unit that has a smaller diameter such that a step is formed, wherein the end of the deburring unit with the smaller diameter which is situated on the side of the work piece consists of a small closing plate in the form of a screw which is realized integrally with the support member. Depending on the respective requirements, the diameter of the tubular shaft section may contain several steps, wherein a deburring unit of identical constructive design is arranged after each step. In order to deburr the tubular ends of a work piece, devices and tools are known from the state of the art which remove burrs on the end of cylindrical pipes along the inner edge as well as the outer edge. A device for simultaneously deburring the inner edge and the outer edge of a cylindrical pipe is disclosed in DE-OS 26 58 344.

The device is realized in the form of a rotationally symmetrical pipe deburring head and consists of an attachment piece with a bore that can be attached to a drive axle of a lathe, as well as a sleeve, in the interior of which two pairs of tools are arranged such that they can be axially displaced relative to one another by means of a pressure medium, for example, compressed oil. If a pipe to be deburred on the outer edge and the inner edge is inserted into the pipe feed opening of the deburring head, both tool pairs can be uniformly pressed against the inner edge and the outer edge of the pipe by increasing the force that axially acts upon the pipe. According to this publication, a simultaneous deburring of both pipe edges should be achieved by rotating the pipe deburring head. The disadvantages of the device disclosed in DE-OS 26 58 344 are that it requires a high manufacturing expenditure and can only be used for simultaneously deburring the inside contour and the outside contour of a cylindrical pipe. These disadvantages are eliminated with the deburring tool according to the invention. For this purpose, the deburring tool needs to be modified in such a way that the tool shaft with the clamping end and the shaft end on the side of the tool are realized integrally with the through-bore, that the shaft end has the shape of a hollow cylinder, that a section of the hollow cylinder which surrounds the tubular end of the work piece to be processed contains in the through-bore several cylindrical blade members with cutting edges that point in the direction of the longitudinal axis, wherein the cylindrical blade members are distributed over the circumference and arranged in the opening, and that the blade members adjoin the conical support members with a certain play, wherein the support members are rigidly connected to and positioned by the small closing plates. The small closing plates seal the ends of the through-bore of the section in a pressure-tight fashion such that the proper function of the deburring tool is ensured. In addition, the inside diameter D4 of the section is larger than the outside diameter of the tubular end of the work piece. In order to simultaneously deburr the interior and exterior of work piece ends, a complete deburring tool with several cutting edges that are distributed over the circumference and point in the direction of the surrounding section of the hollow cylinder needs to be inserted into the hollow cylinder. The inserted deburring tool and the hollow cylinder are connected to one another in a pressure-tight fashion by means of a screw connection that forms an extension of the through-bore. The diameter D5 of the deburring tool is smaller than the inside diameter of the tubular work piece end to be deburred.

Another embodiment of the deburring tool ensures that edge burrs on and in flat surfaces of a work piece, for example, a sheet metal processed with a perforating tool or a punched sheet metal, can be rapidly removed in a cost-efficient fashion without damaging the surface. This deburring tool is characterized in that the tool shaft is rotatable and provided with a cylindrical connecting piece with a larger diameter on the shaft end on the side of the tool, wherein the connecting piece comprises a centrally arranged support member that has the shape of a spherical cap and at least four circularly arranged, offset through-bores for connecting elements that serve for mounting the shaft section, and wherein the shaft section contains in its end face several circularly arranged openings for accommodating the blade members with the cutting edges. The blade members with the cutting edges may also be arranged in the openings in a spiral-shaped fashion or in a plane that lies parallel to the end face of the shaft section. The connecting piece may also comprise a support member in the form of a truncated cone that is arranged in an axially oblique fashion or a cylindrical support member with oblique grooves machined therein which is arranged in an axially oblique fashion.

In addition, it is possible to utilize the deburring tool according to the invention for deburring exterior surfaces of a toothed wheel or a sprocket wheel. In this context, the invention discloses a corresponding method that fulfills the requirements for the deburring of toothed wheels and sprocket wheels in modern intermittent assembly lines. According to this method, the deburring tool is, after having been advanced toward the work piece, guided in a controlled fashion in the radial direction $f_1$ and in the axial direction $f_2$ in accordance with the shape of the work piece to be processed and/or linearly referred to the work piece with a certain advance, namely with a pressure >3 bar, wherein the work piece simultaneously rotates in the clockwise and/or counterclockwise direction with a speed >100 rpm. The aforementioned method is also characterized in that the advance per revolution of the work piece lies between 0.01 and 0.3 mm, preferably between 0.05 and 0.2 mm. It is possible to simultaneously utilize several deburring tools for this purpose.

BRIEF DESCRIPTION OF THE DRAWINGS

The invention is described in greater detail below with reference to embodiments that are illustrated in the figures. The figures show:

FIG. 4, a section through a radial, lateral blade member support;

FIGS. 5a-5e, different variations of the support of the blade member on the support member, namely in the form of sections along the line A-A in FIG. 4;

FIGS. 6a & 6b, blade member variations on the face side in the form of sections along the line B-B in FIG. 4;

FIG. 7 a top view of FIG. 6;

FIGS. 8a & 8b, respective side view of FIGS. 6a & 6b;

FIG. 21, a sectioned side view of a deburring tool for deburring flat surfaces;

FIG. 22, the end face of the shaft section of the deburring tool according to FIG. 21;

FIG. 23, another variation of the end face of the shaft section of the deburring tool according to FIG. 21;

DETAILED DESCRIPTION OF THE INVENTION

Figure 1:
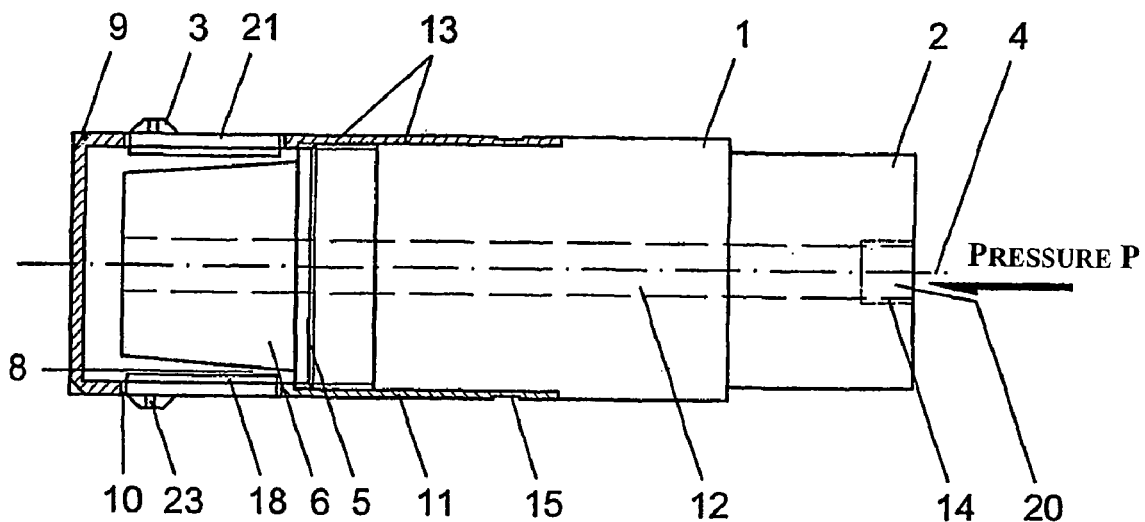
FIG. 1, a section through a deburring tool according to the invention.

FIG. 1 shows a longitudinal section through a deburring tool according to the invention. One can ascertain that a rigid bearing in the form of a conical support member 6 is arranged on the shaft end 5 on the side of the tool. The tubular shaft section 11 is connected to the tool shaft 1 by means of a connecting element 13, for example, a threaded stem and a guide, and holds two rectangular blade members 21 with a radial, lateral limitation 18 of the cutting edge travel, wherein said blade members are movably supported in the opening 10 and loosely adjoin the surface of the support member 6 with a play 8 of at least 0.05 mm. A pre-deburring tool 9 in the form of grooves is arranged on the end face of the tubular shaft section 11. This pre-deburring tool 9 is used for deburring materials with a high extensibility, e.g., steel. In this case, the grooves are arranged at an angle of 45 degrees and have a depth of 0.5 mm and a width of at least 0.8 mm. The pre-deburring tool 9 may also consist of a hollow screw with slots. If drilling oil is introduced into the through-bore 12 with a pressure p via the medium connection 14 that may be realized in the form of a thread or core hole, a pressure is built up on the blade members 21 which causes the cutting edge(s) 3 realized with a shoulder 23 to move outward. The through-bore 12 is arranged in the tool shaft 1 centrally referred to the longitudinal axis 4 up to the end of the support member 6. However, the through-bore could also be arranged asymmetrically. Once the pressure p is reduced to zero bar, the cutting edges 3 move toward the surface of the support member 6. Most machine tools are equipped with a coolant and lubricant supply that is realized via their work spindles and can be programmed with a CNC control. The arrangement of the deburring tool in a work spindle with a medium supply makes it possible to control the pressure p in dependence on path and time. Consequently, the cutting forces of the deburring tool can be variably adjusted as a function of the pressure such that different materials can be easily deburred with the deburring tool according to the invention. It is also possible to compensate increasing burr dimensions caused by the wear of the corresponding tool by increasing the pressure in a time-controlled fashion. In addition, a combination with means for measuring the burrs would be conceivable. A medium connection 14 and an adapter 20 for extending the tool shaft 1 on demand are provided on the end of the tool shaft 1 on the side of the machine. The tubular shaft section 11 has a width across flats 15 in order to rapidly and easily install the deburring tool.

Figure 2:
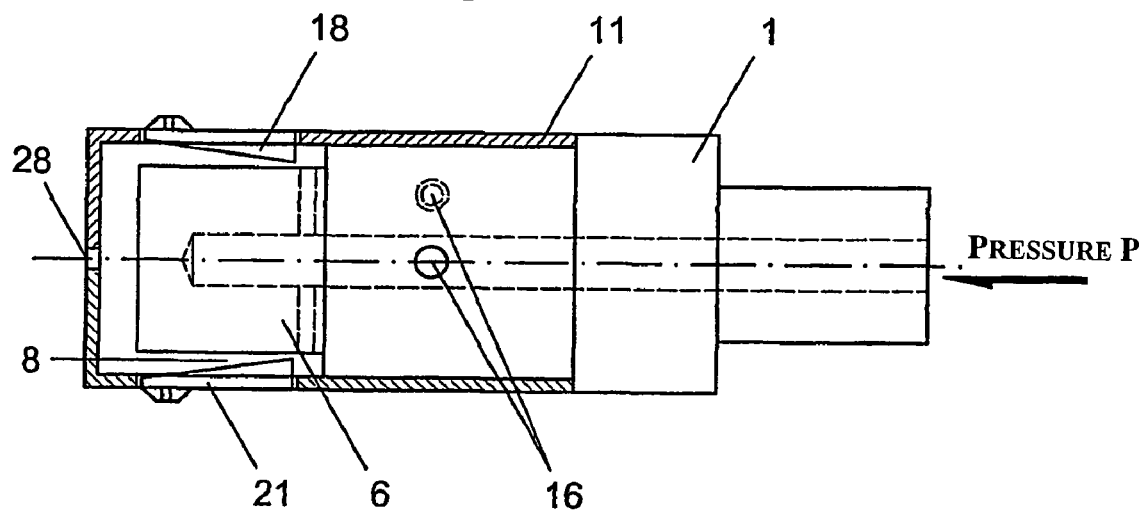
FIG. 2, a section through another embodiment of the deburring tool.

FIG. 2 shows another embodiment of the deburring tool in the form of a section, wherein two conical blade members 21 adjoin the cylindrical support member 6 with a play 8 and thusly ensure a radial, lateral limitation 18 of the cutting edge travel is ensured. The tubular shaft section 11 is connected to the tool shaft 1, for example, by means of dowel pins 16 in this case. A diaphragm 28 in the form of a through-bore is arranged in the end face of the shaft section 11, wherein this diaphragm not only makes it possible to lower the pressure in the deburring tool, but can also be used for cleaning the bore surface, as well as for blowing off oil and/or chips. A pressure reduction can also be achieved if the through-bore 12 in the tool shaft 1 has a blind-hole bore with a radial outlet. In other respects, this embodiment contains no other modifications in comparison with the deburring tool shown in FIG. 1.

Figure 3:
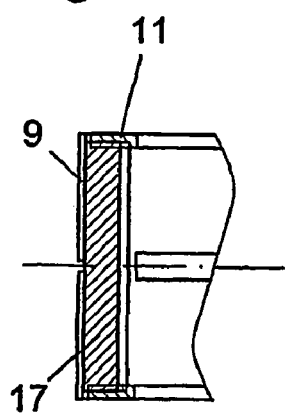
FIG. 3, a section through another variation of the pre-deburring tool.

FIG. 3 shows another embodiment of the pre-deburring tool 9 in the form of a section. One can ascertain that a small closing plate 17 provided with several grooves is arranged on the end face of the tubular shaft section 11.

FIG. 4 shows a section through a radial, lateral blade member support in the unpressurized state, in which the bearing play 8 is equal to zero. The surface of the support member 6 and the surface of the rectangular blade member 21 directly adjoin one another in a loose fashion. One can also ascertain that the tubular shaft section 11 accommodates the blade member 21 with the cutting edge 3 that is movably supported in the opening 10. In order to ensure the proper function of the deburring tool, it is important that twice the length L2 of the projection of the blade member 21 relative to the support member 6 is smaller than or equal to the length L1 of the blade member 21, that the thickness d of the blade member 21 is smaller than the wall thickness a of the tubular shaft section 11, and that the thickness d of the blade member 21 is larger than the height c of the cutting edge. If these constructive characteristics for the radial, lateral limitation of the cutting edge support are not observed, the cutting edge(s) 3 tilt away toward the inside such that the deburring tool is unusable.

FIG. 5 shows different variations of the support of the blade member 21 on the support member 6 in the form of sections along the line A-A in FIG. 4. These variations of the blade member support elucidate the required surface differential between the support member 6 and the blade member 21 in order to ensure the movement of the cutting edge(s) under a pressure p.

FIG. 6 shows two blade member variations on the face side in the form of sections along the line B-B in FIG. 4. The blade member 21 has a cutting edge 3 with a height c and a width b of less than 0.5 mm. This figure also shows the shoulder height 24 that is smaller than or equal to the height c of the cutting edge. The shoulder angle δ is particularly important with respect to smaller transverse bores with diameters of less than 2 mm. It is advantageous to reduce the shoulder angle δ to 5-45 degrees. When deburring larger transverse bores, this shoulder angle may, however, also be larger than 45 degrees. This allows an unobstructed deburring of the transverse bores.

FIG. 7 shows a top view of FIG. 6 with a shoulder 23 and a recess 22 that may be realized differently with respect to the depth C1. This makes it possible to reduce the time required for the movement of the cutting edge under pressure and the cutting edge automatically moves into the starting position. The shoulder 23 absorbs the laterally acting blade member forces and frictional force such that fractures of the cutting edge are prevented.

FIG. 8 shows a side view of FIG. 6. The surfaces F1, F2, F3 of the cutting edge 3 define the clearance angle a of zero degrees. This angle is particularly favorable for achieving an effective deburring of transverse bores, wherein the deburring tool operates in the clockwise direction while it is advanced and in the counterclockwise direction while it is retracted. All known deburring tools have a clearance angle a that is larger than zero degrees on the active cutting edges and consequently are only able to deburr in one direction. This means that new burrs as they are frequently produced during the deburring process cannot be removed in the same production step. The deburring tool according to the invention is able to remove a possibly produced new burr (secondary burr) when it is retracted. Another characteristic of the cutting edge 3 is that the surfaces F1, F2, F3 are always arranged parallel to the x-axis and the y-axis. The cutting edge 3 is also provided with a radial limitation 19 of the cutting edge travel on the face side. The tilting angle γ of the cutting edge 3 is larger than zero degrees and prevents damages on the work piece surfaces, for example, on the bore wall, during the deburring process.

Figure 9:
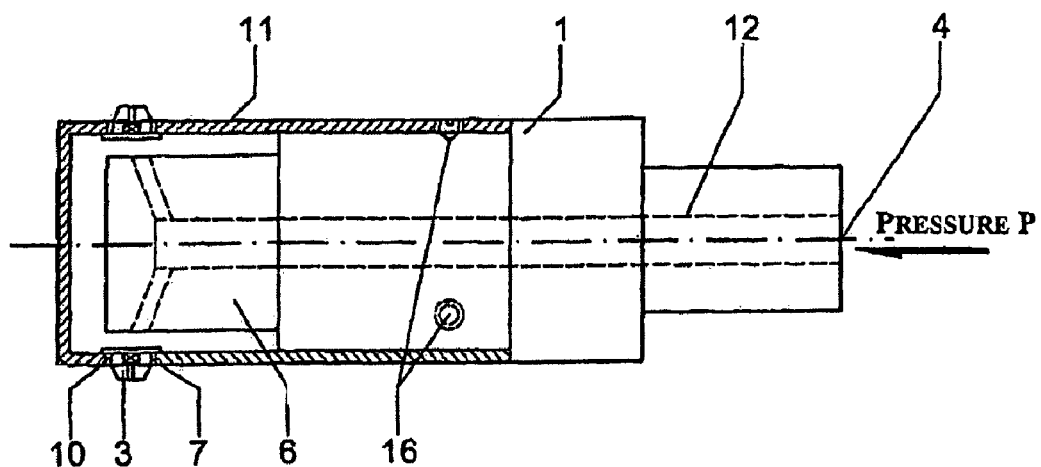
FIG. 9, a longitudinal section through another embodiment of the deburring tool.
Figure 10A:
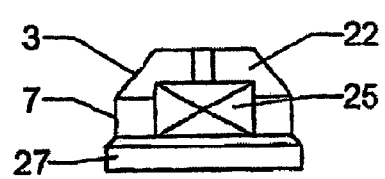
FIGS. 10a-10g, side views and top view of round blade member receptacles with different variations of the cutting edge and the shoulder.
Figure 10B:
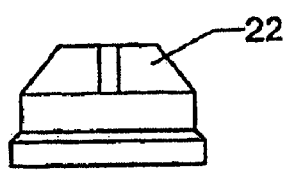
Figure 10C:
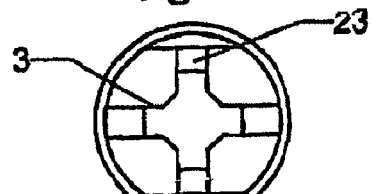
Figure 10D:
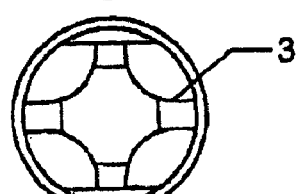
Figure 10E:
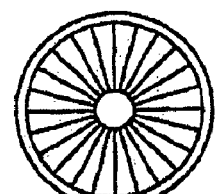
Figure 10F:
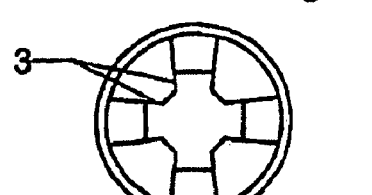
Figure 10G:
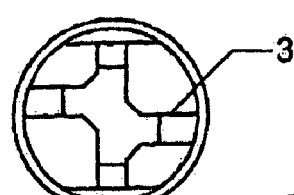

FIG. 9 shows a longitudinal section through another embodiment of the deburring tool. In this case, the tool shaft 1 is connected to the tubular shaft section 11 by means of three setscrews 16 that are offset on the circumference of the shaft section 11 by 60 degrees. The through-bore 12 is arranged in the tool shaft 1 centrally referred to the longitudinal axis 4 up to the middle of the cylindrical support member 6. Two bores 26 extend directly in the direction of the cutting edges 3 from the end of the through-bore 12 in the support member 6. The blade center section 7 holds the cutting edge 3, is realized round or with two laterally arranged surfaces and movably supported in the opening 10 of the shaft section 11.

FIG. 10 shows side views and top views of several round blade member receptacles with different variations of the cutting edge 3 and the shoulder 23. The variations in a) and b) are illustrated in the form of side views, wherein a) shows a cylindrical limitation 27 of the cutting edge travel with a blade center section 7 and the directly adjacent cutting edge 3. The blade center section has a flat 25 that serves as a turning safety. This flat is not provided in b). The blade member receptacles in c), d), e), f) and g) are illustrated in the form of top views, wherein c) shows two cutting edges 3 and two milled shoulders 23, and wherein d) shows two cutting edges and two bored shoulders. The blade member receptacle illustrated in e) is provided with serrated edges and suitable for deburring bores in castings. The cutting edges are able to better compensate the casting tolerances. The blade member receptacle illustrated in f) has two cutting edges and two shoulders, wherein the cutting edges and the shoulders and not realized parallel referred to the axial center. In the blade member receptacles illustrated in e) and f), the shoulder and the cutting edge may alternate because the arrangement is not fixed by means of a flat. This means that a sort of self-fixing effect in accordance with the conditions on the burr is achieved. The round blade member receptacle illustrated in g) is realized with asymmetrically arranged cutting edges and shoulders.

Figure 11:
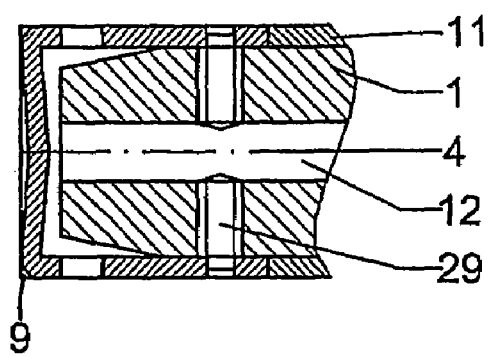
FIG. 11, a section through another connection between the shaft section and the tool shaft.

FIG. 11 shows a section through a different connection between the tubular shaft section 11 and the tool shaft 1. This connection is characterized in that at least two internal setscrews 29 extend through the shaft section 11, through the tool shaft 1 and into the through-bore 12 transverse to the longitudinal axis 4. The internal setscrews 29 may also end at the through-bore 12. The position of the internal setscrews 29 defines the cross-sectional size of the through-bore 12. Consequently, the flow rate of the medium pressed into the through-bore 12, as well as the pressure p on the blade member surfaces, can be varied in a controlled fashion.

Figure 12:
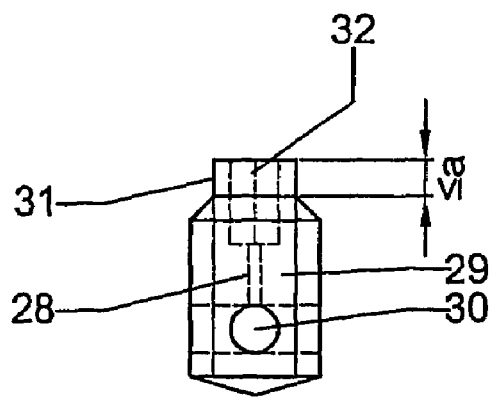
FIG. 12, a variation of the internal setscrew shown in FIG. 11.

FIG. 12 shows an embodiment of the internal setscrew 29 according to FIG. 11. The end of the internal setscrew 29 on the side of the through-bore contains at least one transverse bore 30 that ensures a flow in all positions of the internal setscrew 29 and thusly is able to function as a throttle/diaphragm. A bore 28 that acts as a throttle/diaphragm may also be provided in the longitudinal direction of the internal setscrew 29. This makes it possible to reduce the pressure in the radial direction of the deburring tool. All known cooling and lubricating systems for machine tools are designed for high pressures and do not allow a fine adjustment within the lower pressure ranges around, for example, 3 bar used in the deburring of aluminum or cast-iron castings. This is the reason why the deburring tool has several options for reducing the pressure, wherein said options can be selectively utilized depending on the respective application. The diameter of the end 31 on the side of the shaft section is smaller than the outside diameter of the internal setscrew 29, and its length is shorter than the wall thickness a of the shaft section 11. The transition from the end 31 on the side of the shaft section to the outside diameter of the internal setscrew 29 is advantageously realized in a spherical or conical fashion. For example, a hexagon socket 32 for a hex key is arranged in the end on the side of the shaft section in order to simplify the installation and the operation. The hexagon socket 32 may also be replaced with a slot or a cross recess.

Figure 13:
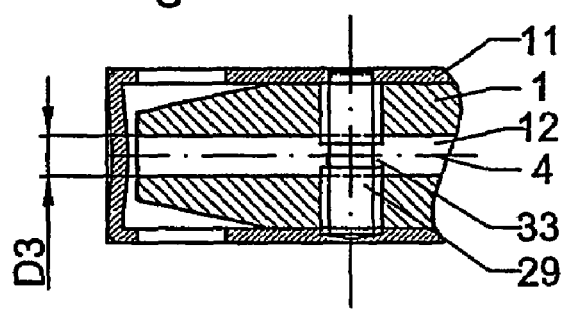
FIG. 13, a section through the new connection between the shaft section and the tool shaft.

FIG. 13 shows a section through the new connection between the shaft section and the tool shaft. One can ascertain that the tubular shaft section 11 is connected to the tool shaft 1 by means of an internal setscrew 29 that extends through the through-bore 12 transverse to the longitudinal axis 4. The internal setscrew 29 contains a groove 33 in the region of the through-bore 12.

Figure 14:
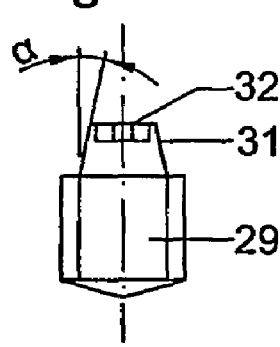
FIG. 14, a longitudinal section through another embodiment of the end of the internal setscrew on the side of the shaft section which is shown in FIG. 13.

FIG. 14 shows a longitudinal section through another embodiment of the end of the internal setscrew on the side of the shaft section. The end 31 of the internal setscrew 29 on the side of the shaft section is realized in a conical fashion, wherein the angle α is <10 degrees. This makes it possible, among other things, to prevent damages on the bore wall and to achieve an improved compensation of the tolerance of the internal setscrew referred to the blade member that is movably supported in the opening. A hexagon socket 32 is provided on the end 31 on the side of the shaft section for installation purposes.

Figure 15:
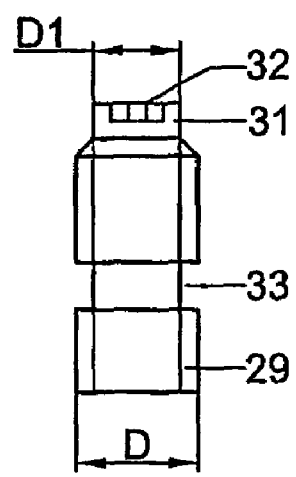
FIG. 15, a longitudinal section through the internal setscrew shown in FIG. 13.

FIG. 15 shows a longitudinal section through the internal setscrew according to FIG. 13. A reliable deburring of extremely small bore diameters such as, for example, 2.8 mm is possible if the diameter D3 of the through-bore 12 of the tool shaft 1 is larger than the core diameter D1 of the internal setscrew 29 and the diameter D3 of the through-bore 12 and the diameter D of the internal setscrews 29 are identical. If these dimensions are observed, the medium pressed into the through-bore 12, e.g., compressed air, is able to reach the cutting edges in an unrestricted fashion.

Figure 16:
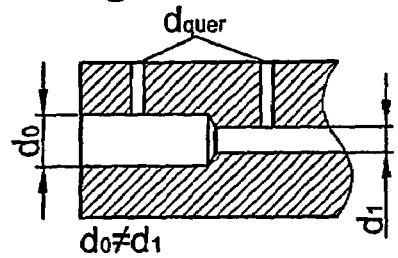
FIG. 16, a bore with two different diameters and two transverse bores in a work piece.

FIG. 16 shows a bore with two different diameters $d_0$; $d_1$ and with two transverse bores $d_{quer}$ in a work piece. This means that the deburring tool needs to have two different diameters in order to deburr these abutting edges on the transverse bores.

Figure 17:
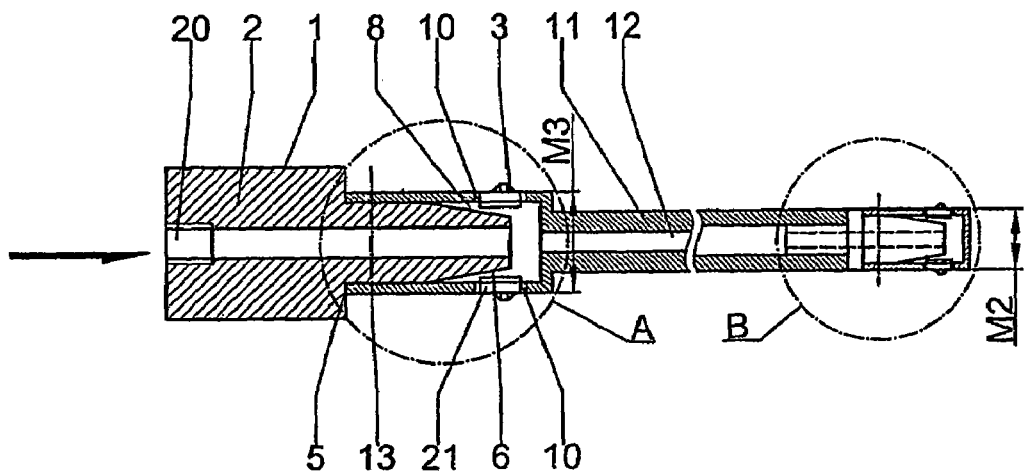
FIG. 17, a corresponding deburring tool.

FIG. 17 shows a deburring tool that is realized in the form of a stepped tool for deep-hole bores and comprises deburring units A and B for deburring the abutting edges on the intersecting bores with the diameters $d_0/d_{quer}$ and $d_1/d_{quer}$ in the work piece according to FIG. 16. The deburring unit A with the diameter M3 deburrs the abutting edges on the intersecting bores with the diameters $d_0/d_{quer}$, and the deburring unit B with the diameter M2 deburrs the abutting edges on the intersecting bores with the diameters $d_1/d_{quer}$. Both deburring units A; B contain the same base part in the form of a tubular shaft section (11) with a centrally arranged through-bore (12). The diameter M of this base part may, if so required, be stepped several times, wherein an analogous deburring unit is arranged after each step.

Figure 18:
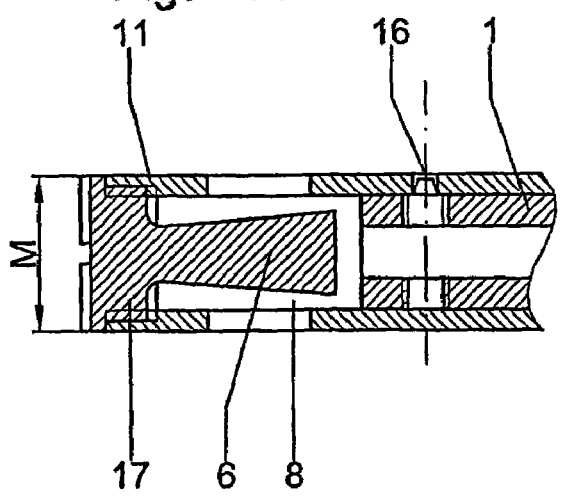
FIG. 18, a special variation of the end of the deburring tool according to FIG. 17 on the side of the work piece.

FIG. 18 shows a special variation of the end of the deburring tool on the side of the work piece according to FIG. 17. This figure shows a small closing plate 17 in the form of a screw that is realized integrally with the support member 6. The tool shaft 1 is connected to the tubular shaft section 11 by means of a pin 16. The proper function of the deburring tool is ensured by the play 8 provided between the support member 6 and the tubular shaft section 11. This special variation of the end of the deburring tool on the side of the tool ensures a linear pressure supply such that, among other things, the efficiency of the deburring tool is decisively improved.

Figure 19:
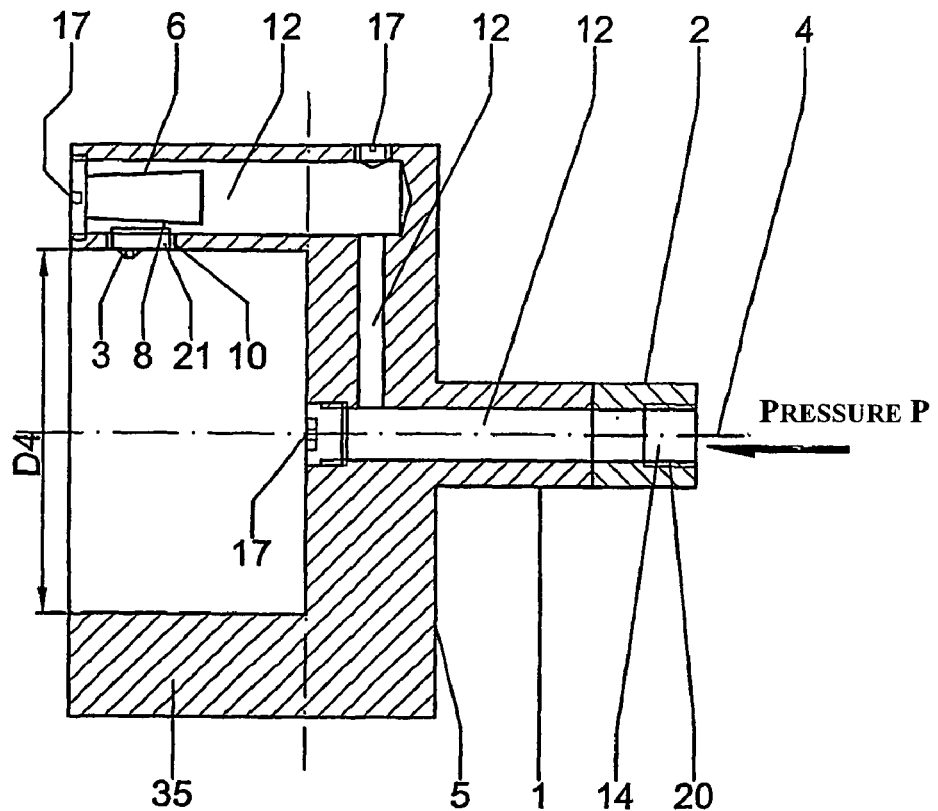
FIG. 19, a section through a deburring tool for deburring the outer edge of tubular ends of a work piece.

FIG. 19 shows a section through a deburring tool for deburring the outer edge of tubular ends of a work piece. One can ascertain that the tool shaft 1 with the clamping end 2 and the shaft end 5 on the side of the tool which has the shape of a hollow cylinder are realized integrally with the inner through-bore 12. The section 35 of the hollow cylinder surrounds the tubular end of the (not-shown) work piece to be processed and contains in the through-bore 12 several cylindrical blade members 21 that are distributed over the circumference and arranged in the opening 10, wherein the blade members contain cutting edges 3 that point in the direction of the longitudinal axis 4. The ends of the through-bore 12 of the section 35 are sealed in a pressure-tight fashion with small closing plates 17. The blade members 21 that adjoin the conical support member 6 with a play 8 can be positioned accordingly by rigidly connecting the support member 6 to the small closing plates 17. It is important for the proper function of the deburring tool that the inside diameter D4 of the section 35 is larger than the outside diameter of the tubular end of the work piece to be processed.

Figure 20:
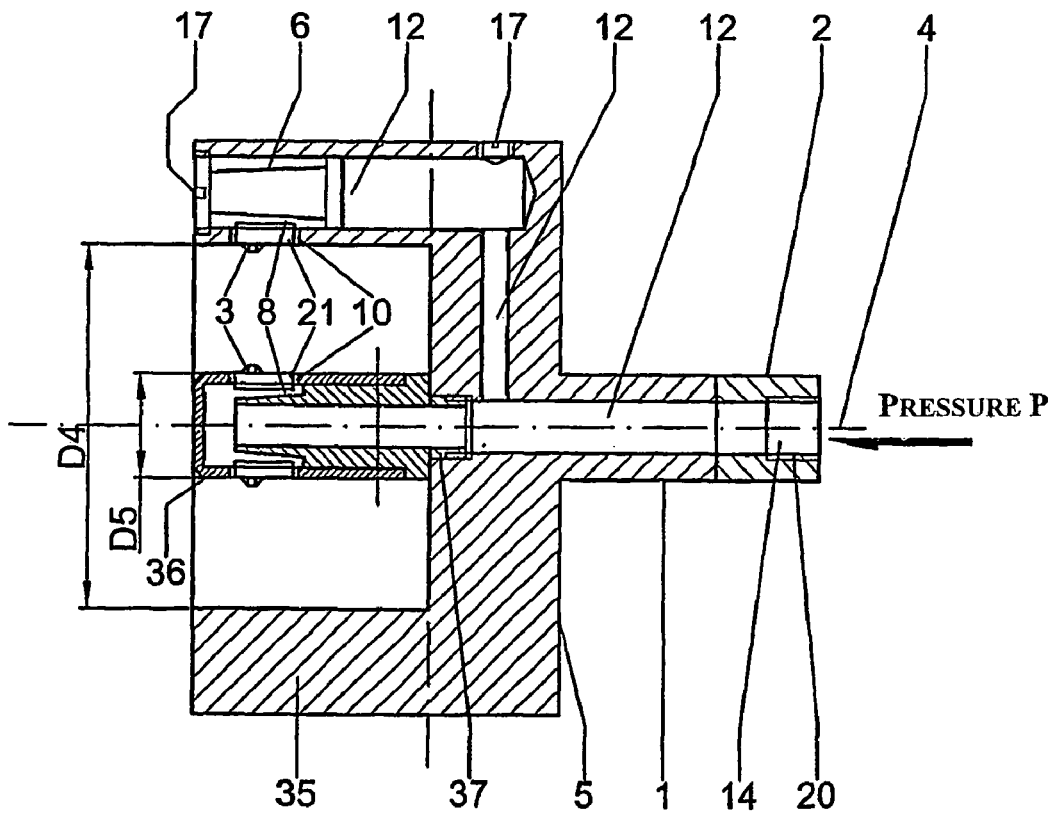
FIG. 20, a section through a deburring tool for simultaneously deburring the outer edge and the inner edge of tubular ends of a work piece.

FIG. 20 shows a section through a deburring tool for simultaneously deburring the outer edge and the inner edge of tubular ends of a work piece. For this purpose, the deburring tool shown in FIG. 19 can be rapidly and easily modified in such a way that a complete deburring tool 36 is inserted into the hollow cylinder 5. The deburring tool 36 has several cutting edges 3 that are distributed over the circumference and point in the direction of the surrounding section 35 of the hollow cylinder. The hollow cylinder 5 and the deburring tool 36 are connected by means of a screw connection 37 that forms an extension of the through-bore 12. In order to achieve the simultaneous deburring of the inner edges and outer edges of tubular ends of a work piece, the diameter D5 of the deburring tool 36 needs to be smaller than the inside diameter of the tubular end of the work piece.

FIG. 21 shows a sectioned side view of an embodiment of a deburring tool for deburring edge burrs on and in flat surfaces of a work piece. In this figure, the end 5 of the tool shaft 1 on the side of the tool is rigidly connected to a cylindrical connecting piece 34 of larger diameter, wherein the connecting piece 34 comprises a centrally arranged support member 6 that has the shape of a spherical cap and four circularly arranged through-bores that are offset by 90° and serve for accommodating setscrews 16 for mounting the shaft section 11, the end face of which contains several openings 10 for accommodating the blade members 21 with the cutting edges 3. These blade members are arranged in the openings 10 in a plane that lies parallel to the end face of the shaft section 11 such that the cutting edges 3 deburr like a milling cutter and are particularly suitable for the deburring of large flat surfaces.

FIG. 22 shows the end face of the shaft section of the deburring tool according to FIG. 21. One can ascertain that the end face of the shaft section 11 contains eight circularly arranged openings 10 and four circularly arranged through-bores that are offset by 90° and serve for accommodating the setscrews 16 for mounting the shaft section 11 on the connecting piece 34.

FIG. 23 shows another variation of the end face of the shaft section of the deburring tool according to FIG. 21. The end face contains four circularly arranged setscrews 16 that are offset by 90° and four openings 10 for accommodating the blade members with the cutting edges.

Figure 24:
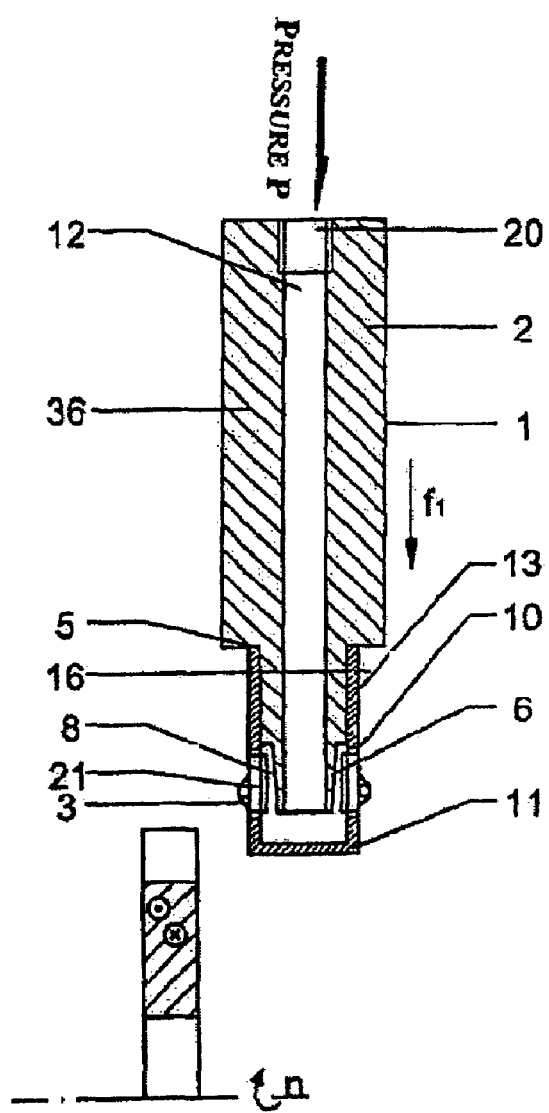
FIG. 24, a section through an advanced deburring tool for deburring the exterior of a toothed wheel.

FIG. 24 shows a section through an advanced deburring tool for deburring the exterior of a toothed wheel. After the toothed wheel has been set into a clockwise rotation with a speed of 120 rpm, the deburring tool 36 is linearly guided in a controlled fashion toward the toothed wheel in the radial direction $f_1$ with a pressure of 5 bar and advanced by 0.07 mm per revolution of the toothed wheel. When the deburring tool is retracted, the deburring is carried out with the same rotation of the toothed wheel in the counterclockwise direction. This makes it possible to deburr an addendum of 4 mm in less than 50 seconds independently of the toothed wheel diameter.

Figure 25:
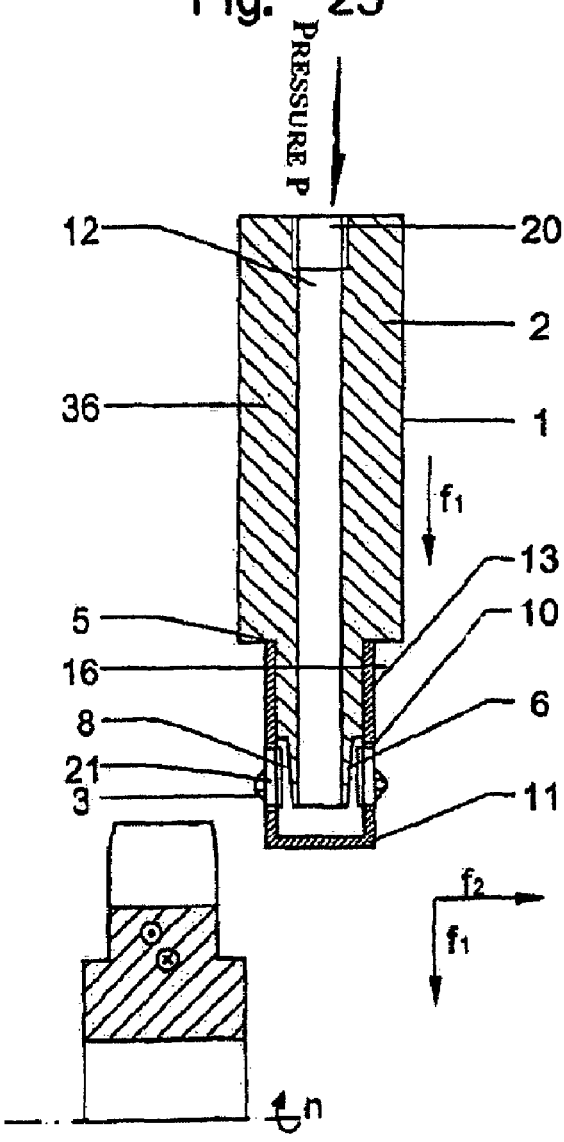
FIG. 25, a section through an advanced deburring tool for deburring the exterior of a sprocket wheel, and FIGS. 26a & 26b, a top view of a tubular shaft section with three openings and a section view through the tubular shaft section along the line C-C.

FIG. 25 shows a section through an advanced deburring tool for deburring the exterior of a sprocket wheel. The sprocket wheel rotates in the clockwise direction with a speed of 200 rpm. The deburring tool is guided in a controlled fashion in the radial direction $f_1$ and in the axial direction $f_2$ such that it follows the shape of the sprocket wheel with a pressure of 4 bar and advanced by a distance that was determined to be 0.07 mm per revolution of the sprocket wheel in the advance as well as the retraction mode. The depth of the teeth of the sprocket wheel lies at 60 mm. The time required for deburring 36 teeth including the addendum and dedendum circles is approximately 45 seconds. The method according to the invention may also be used for simultaneously deburring the exterior of several sprocket wheels if two deburring tools are arranged offset to one another. This would make it possible to simultaneously deburr several tooth profiles such that the deburring time is additionally reduced.

Figures 26A, 26B:
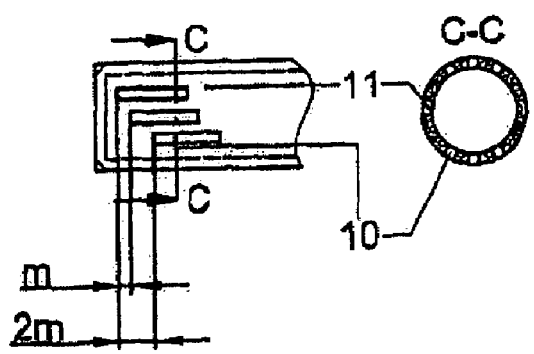

FIG. 26 shows a top view of a tubular shaft section 11 with three openings 10 that are offset by 0.1 mm in the axial direction. In the section C-C through the tubular shaft section 11, one can ascertain that six openings 10 are actually arranged radially symmetrical in the tubular shaft section 11, wherein three openings 10 respectively lie closely adjacent to and opposite of one another. The openings 10 accommodate the not-shown blade members with the cutting edges. In such an arrangement of the openings 10, three cutting edges are in direct contact and three cutting edges are in indirect contact. The axial offset by the distance m makes it possible to increase the total advance per revolution of the deburring tool to 0.6 mm.

LIST OF REFERENCE SYMBOLS

1 Tool shaft
2 Clamping end
3 Cutting edge
4 Longitudinal axis
5 Shaft end on the side of the tool
6 Support member
7 Cylindrical blade center section
8 Bearing play
9 Pre-deburring tool
10 Opening
11 Tubular shaft section
12 Through-bore
13 Connecting element (threaded stem and guide)
14 Medium connection
15 Width across flats
16 Connecting element (setscrew, pin, dowel pin)
17 Small closing plate
18 Radial, lateral limitation of the cutting edge travel
19 Radial limitation of the cutting edge travel on the face side
20 Adapter
21 Blade member
22 Recess
23 Shoulder
24 Shoulder height
25 Flat
26 Bore
27 Cylindrical limitation of the cutting edge travel
28 Diaphragm/throttle
29 Internal setscrew
30 Transverse bore
31 End on the side of the shaft section
32 Hexagon socket
33 Groove
34 Connecting piece
35 Section
36 Deburring tool as a unit
37 Screw connection
a Wall thickness of the shaft section 11
b Width of the cutting edge
c Height of the cutting edge
C1 Countersinking depth
d Thickness of the blade member 21
f Width of the shoulder 21
L1 Length of the blade member 21
L2 Length of the projection of the cutting edges—relative to the support member
F1 Surface of the cutting edge 3
F2 Surface of the cutting edge 3
F3 Surface of the cutting edge 3
A Deburring unit
B Deburring unit M General diameter of the shaft section 11
M2 Smaller diameter of the shaft section 11
M3 Larger diameter of the shaft section 11
D Diameter of the internal setscrew 29
D1 Core diameter of the internal setscrew 29
D3 Diameter of the through-bore 12
D4 Inside diameter of the section 35
D5 Diameter of the deburring tool 36
$f_1$ Advance in the radial direction
$f_2$ Advance in the axial direction

The invention claimed is:

1. A deburring tool for deburring an interior and/or exterior of a work piece wherein said deburring tool is moved in a rotatory and/or translatory fashion during use, comprising
   a tool shaft (1) having a clamping end (2) and an end (5) with an internal support member (6) including an elastomer material, and wherein said support member supports at least one support surface of a blade member (21) with a cutting edge (3) that is movably arranged in the opening (10) and radially acts upon the cutting edge (3) with a spring force, wherein
   the support member (6) is arranged on the shaft end (5) on the tool side in form of a rigid bearing, and wherein
   a tubular shaft section (11) is connected to the tool shaft (1) by one or more connecting elements (13) holding the blade member (21) that is movably supported in the opening (10) and loosely adjoins the surface of the support member (6) with a play (8), wherein the surface of the support member and the surface of the blade member (21) always differ geometrically with respect to their shape and dimensions, and wherein
   a liquid or gaseous medium or a liquid/gas mixture that is pressed into a through-bore (12) of the tool shaft (1) causes the cutting edge (3) to move outward.

2. The deburring tool according to claim 1, wherein the connecting element (13) comprises a threaded stem and a guide.

3. The deburring tool according to claim 1, wherein the shaft section (11) is connected to the tool shaft (1) by several dowel pins (16).

4. The deburring tool according to claim 1, wherein the shaft section (11) is connected to the tool shaft (1) by several setscrews (16) that are offset by 60 degrees on the circumference of the shaft section (11).

5. The deburring tool according to claim 1, wherein at least two internal setscrews (29) extend through the shaft section (11), though the tool shaft (1) and up to or into the thoughbore (12) transverse to the longitudinal axis (4).

6. The deburring tool according to claim 5, wherein the internal setscrews (29) contain bores (28; 30) that extend in the radial and/or axial direction.

7. The deburring tool according to claim, 5 wherein the internal setscrews (29) include a hexagon socket (32) on the end (31) on the side of the shaft section and at least one transverse bore (30) on the end on the side of the throughbore.

8. The deburring tool according to claim 5 wherein the length of the end (31) of the internal setscrew (29) on the side of the shaft section is smaller than the wall thickness a of the shaft section (11), and wherein the diameter of the end of the internal setscrew (29) on the side of the shaft section is smaller than the outside diameter of the internal setscrew (29).

9. The deburring tool according to claim 5, wherein the transition from the end (31) of the internal setscrew (29) on the side of the shaft section to the outside diameter of the internal setscrew (29) is realized spherically or conically.

10. The deburring tool according to claim 1, wherein the clamping end (2) of the tool shaft (1) includes a medium supply connection (14) and an adapter (20) for extending the shaft on the end on the side of the machine.

11. The deburring tool according to claim 1, wherein the end face which forms the termination of the shaft section (11) is provided with several grooves and forms a pre-deburring tool (9).

12. The deburring tool according to claim 11, wherein the pre-deburring tool (9) comprises a small closing plate (17) that is provided with one or more grooves.

13. The deburring tool according to claim 11, wherein the pre-deburring tool (9) comprises a hollow screw with slots.

14. The deburring tool according to claim 1, wherein a diaphragm (28) in the form of a through-bore is arranged in the end face of the shaft section (11).

15. The deburring tool according to claim 1, wherein the surfaces of the blade member (21) and of the support member (6) which contact one another are realized in a rectangular, triangular, cylindrical or prismatic fashion, and wherein the surfaces are arranged parallel as well as non-parallel to the longitudinal axis (4) of the tool shaft (1).

16. The deburring tool according to claim 1, wherein the blade member (21) comprises a blade center section (7) with a cutting edge (3), a radial, lateral limitation (18) of the cutting edge travel and a radial limitation (19) of the cutting edge travel on the face side, respectively, or a cylindrical limitation (27) of the cutting edge travel.

17. The deburring tool according to claim 1, wherein twice the length L2 of the projection of the blade member (21) relative to the support member (6) is smaller than or equal to the length L1 of the blade member (21).

18. The deburring tool according to claim 1, wherein the cutting edge (3) has a height c and a width b of less than 0.5 mm.

19. The deburring tool according to claim 1, wherein a thickness d of the blade member (21) is larger than a height c of the cutting edge.

20. The deburring tool according to claim 1, wherein a thickness d of the blade member (21) is smaller than a wall thickness a of the tubular shaft section (11).

21. The deburring tool according to claim 1, wherein the cutting edge (3) includes a shoulder (23) and a recess (22) of different depth.

22. The deburring tool according to claim 1, wherein the cutting edge (3) includes a shoulder (23) having a shoulder height (24) smaller than or equal to a height c of the cutting edge.

23. The deburring tool according to claim 1, wherein the cutting edge (3) includes a shoulder (23) forming a shoulder angle δ between 5 and 45 degrees when deburring transverse bores with a diameter of less than 2 mm. wherein the angle δ is an inclination of the shoulder (23) relative to the x-axis.

24. The deburring tool according to claim 1 wherein the cutting edge (3) includes a shoulder (23) forming a shoulder angle δ larger than 45 degrees when deburring transverse bores with a diameter larger than 2 mm, wherein the angle δ is an inclination of the shoulder (23) relative to the x-axts.

25. The deburring tool according to claim 1, wherein the cutting edge (3) has a clearance angle α of zero degrees in the area of contact with the abutting edges.

26. The deburring tool according to claim 25, wherein by a plurality of surfaces Fl, F2, F3 form the cutting edge (3), clearance angle a is an inclination of each of the plural surfaces Fl, P2. F3 relative to the x-axis.

27. The deburring tool according to claim 26, wherein the surfaces F1, F2, F3 forming the cutting edge (3) are always arranged parallel to the x-axis and the y-axis.

28. The deburring tool according to claim 27, wherein the cutting edge comprises a tilting angle γ which is larger than zero degrees, wherein the angle γ is an inclination of the surface F3 relative to the y-axis.

29. The deburring tool according to claim 1, wherein the liquid or gaseous medium or the liquid gas mixture has a pressure ρ which is adjustable in accordance with burr dimensions that change during the machining process.

30. The deburring tool according to claim 29, wherein the pressure ρ is adjustable in dependence on the material.

31. The deburring tool according to claim 1, further comprising a burr measuring means for determining an adjustment of a pressure ρ.

32. The deburring tool according to claim 31, wherein the pressure ρ on the blade member surface is higher than the atmospheric pressure and lower than 500 bar.

33. The deburring tool according to claim 1, wherein the through-bore (12) is arranged in the tool shaft (1) centrally referred to the longitudinal axis (4) up to the end of the support member (6).

34. The deburring tool according to claim 1, wherein the through-bore (12) in the tool shaft (1) comprises a blind-hole bore with a radial outlet.

35. The deburring tool according to claim 1, wherein the through-bore (12) is arranged in the tool shaft (1) centrally referred to the longitudinal axis (4) up to the center of the support member (6), and wherein bores (26) in the support member (6) directly lead in the direction of the cutting edges (3) from this end of the through-bore (12).

36. The deburring tool according to claim 1, wherein the liquid medium pressed into the through-bore (12) of the tool shaft (I) comprises a drilling medium for cooling and/or lubricating purposes.

37. The deburring tool according to claim 1, wherein the gaseous medium pressed into the through-bore (12) of the tool shaft (1) comprises one of a welding gas, an inert gas, compressed air or carbon dioxide.

38. The deburring tool according to claim 1, wherein the liquid/gas mixture pressed into the through-bore (12) of the tool shaft (1) comprises air that contains about 10-15 percent admixed tilling oil.

39. The deburring tool according to claim 1, wherein transverse bores need to be deburred in clockwise direction when the deburring tool is advanced and in counterclockwise direction when the deburring tool is retracted.

40. The deburring toot according to claim 1, wherein the tubular shaft section (11) is connected to the tool shaft (1) by an internal setscrew (29) that extends through the through-bore (12) transverse to the longitudinal axis (4), wherein the core diameter Dl of the internal setscrew is smaller than the diameter D3 of the through-bore (12) and its diameter I) is equal to the diameter D3 of the through-bore (12).

41. The deburring tool according to claim 40, wherein the internal setscrew (29) contains a groove (33) in the region of the through-bore (12).

42. The deburring tool according to claim 40, wherein the end (31) of the internal setscrew (29) on the side of the shaft section is realized conically with an angle α of <10 degrees.

43. The deburring tool according to claim 39, wherein the tubular shaft section (11) having a diameter M3 and the centrally arranged through-bore (12) is extended after a deburring unit A, namely with a deburring unit B that has a smaller diameter M2, wherein the end of the deburring unit B on the side of the work piece comprises a small closing plate (17) in the form of a screw which is realized integrally with the support member (6).

44. The deburring tool according to claim 43, wherein the deburring units A and B have the same constructive design.

45. The deburring tool according to claim 44, wherein the diameter M of the tubular shaft section (11) is stepped several times, and a deburring unit is arranged after each step.

46. The deburring tool according to claim 43, wherein a play (8) exists between the tubular shaft section (11) and the support member (6).

47. The deburring tool according to claim 1, wherein
the tool shaft (1) with the clamping end (2) and the shaft end (5) on the side of the tool are realized integrally with the inner through-bore (12), wherein
the shaft end (5) has the shape of a hollow cylinder, and wherein
a section (35) of the hollow cylinder which surrounds the tubular end of the work piece to be processed contains in the through-bore (12) several cylindrical blade members (21) with cutting edges (3) that point in the direction of the longitudinal axis (4), wherein the blade members are distributed over the circumference and arranged in the opening (10), and wherein
the blade members (21) adjoin support members (6) that are realized in a conical fashion with a play (8), wherein the support members (6) are rigidly connected to and positioned by the small closing plates (17).

48. The deburring tool according to claim 47, wherein the inside diameter D4 of the section (35) is larger than the outside diameter of the tubular end of the work piece.

49. The deburring tool according to claim 17, wherein the small closing plates (17) seal the ends of the though-bore (12) of the section (35) in a pressure-tight fashion.

50. The deburring tool according to claim 49, wherein a complete deburring tool (36) is inserted into the hollow cylinder (5), wherein the deburring tool contains several cutting edges (3) that are distributed over the circumference and point in the direction of the surrounding section (35) of the hollow cylinder.

51. The deburring tool according to claim 50, wherein the deburring tool (6) and the hollow cylinder (5) are connected in a pressure-tight fashion by means of a screw connection (37) that forms an extension of the through-bore (12).

52. The deburring tool according to claim 51, wherein the deburring tool (36) has a diameter D5 which is smaller than the inside diameter of the tubular end of the work piece.

53. The deburring tool according to claim 42, wherein the tool shaft (1) is rotatable and rigidly connected to a cylindrical connecting piece (34) of larger diameter on the shaft end (5) on the side of the tool, wherein the connecting piece (34) has a centrally arranged support member (6) that has the shape of a spherical cap and at least four circularly arranged, offset though-bores for connecting elements (16) that serve for mounting the shaft section (11), and wherein the end face of the shaft section contains several circularly arranged openings (10) for accommodating the blade members (21) with the cutting edges (3).

54. The deburring tool according to claim 53, wherein the blade members (21) with the cutting edges (3) are arranged in the openings (10) in a plane that lies parallel to the end face of the shaft section (11).

55. The deburring tool according to claim 53, wherein the blade members (21) with the cutting edges (3) are arranged in the openings (10) in a spiral-shaped fashion referred to the end face of the shaft section (11).

56. The deburring tool according to claim 53, wherein the connecting piece (34) has a support member (6) in the form of a truncated cone which is arranged in an axially oblique fashion.

57. The deburring tool according to claim 53, wherein the connecting piece (34) has a cylindrical support member (6) with oblique grooves machined therein which is arranged in an axially oblique fashion.

58. The deburring tool according to claim 57, wherein at least two openings (10) that lie closely adjacent to one another are arranged in the tubular shaft section (11) in a radially symmetrical fashion and offset in the axial direction by a distance m.

59. The deburring tool according to claim 58, wherein the opening (10) comprises more than one opening which are arranged asymmetrically in the tubular shaft section (11).

60. The deburring tool according to claim 59, wherein the distance m is smaller than the advance per cutting edge.

61. The deburring tool according to claim 32, wherein the pressure p on the blade member surface is between 4 and 60 bar.

62. The deburring toot according to claim 36, wherein the cooling and/or lubricating purposes is a drilling emulsion, a drilling oil or a mixture or another medium.

* * * * *

UNITED STATES PATENT AND TRADEMARK OFFICE
CERTIFICATE OF CORRECTION

PATENT NO.         : 7,507,057 B2
APPLICATION NO. : 10/504360
DATED                 : March 24, 2009
INVENTOR(S)       : Hans-Michael Beier It is certified that error appears in the above-identified patent and that said Letters Patent is hereby corrected as shown below:

Column 14, line 65 "(3)" should read -- (3), wherein a --.

Column 14, line 66 "a" should read -- α --.

Signed and Sealed this

Twenty-fourth Day of November, 2009

David J. Kappos
*Director of the United States Patent and Trademark Office*